Patented Jan. 22, 1952

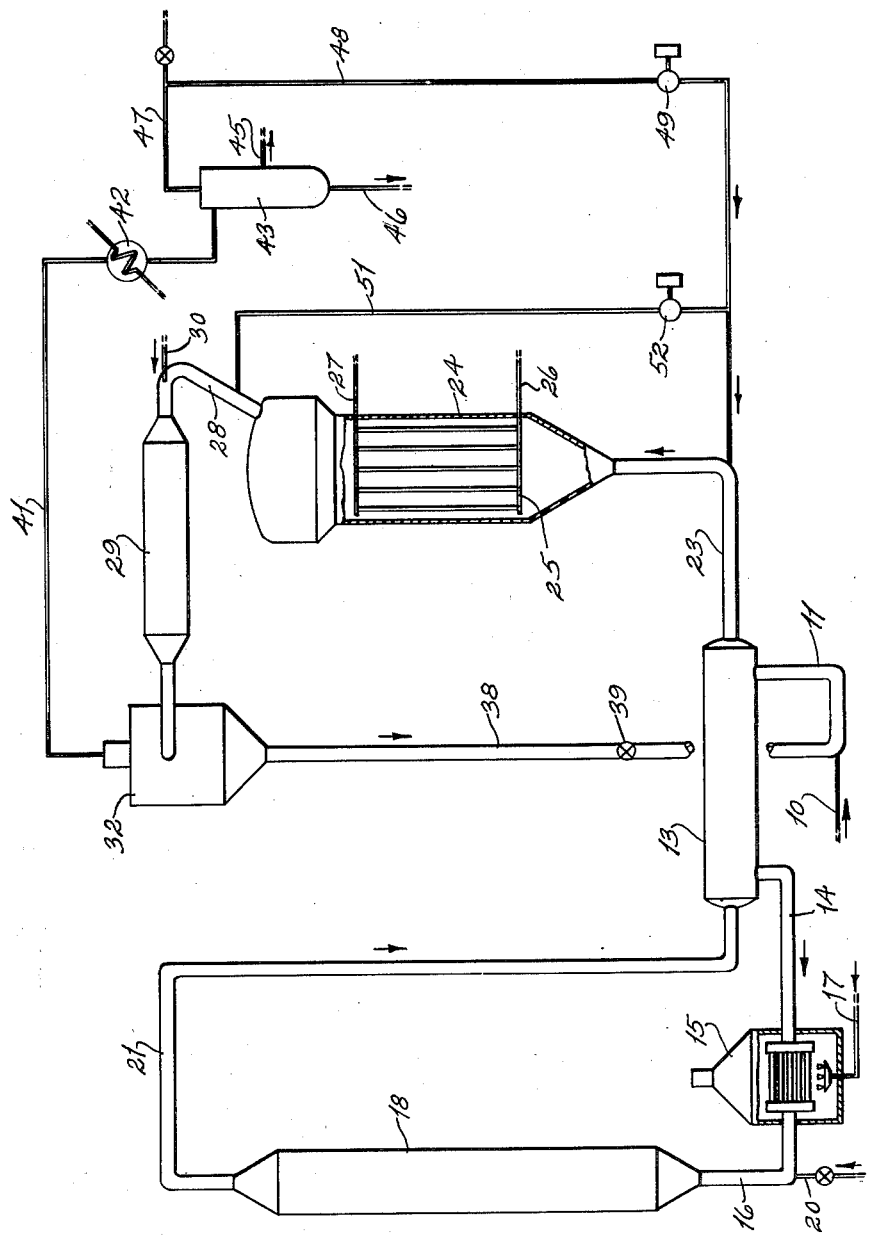

2,583,134

UNITED STATES PATENT OFFICE 2,583,134

CATALYTIC SYNTHESIS OF HYDROCARBONS

Harold V. Atwell, Beacon, N. Y., assignor to The Texas Company, New York, N. Y., a corporation of Delaware Application June 22, 1948, Serial No. 34,533

12 Claims. (Cl. 260—449.6)

The present invention relates to the continuous production of synthetic hydrocarbons, and more specifically, involves the conversion of hydrocarbonaceous raw materials into desired hydrocarbon products by the integrated, continuous conversion of the raw material into a synthesis gas through the agency of a reducible metal oxide, followed by subsequent catalytic conversion of the synthesis gas into predetermined product hydrocarbons, during which the reduced metal oxide continuously exerts a beneficial effect.

More specifically, the invention contemplates continuously reacting a hydrocarbonaceous feed material as above with a reducible metal oxide in finely powdered form, preferably in fluid phase condition, under elevated temperature and pressure such that the oxide is reduced and the hydrocarbon simultaneously converted to synthesis gas, that is, hydrogen and carbon monoxide. The gaseous products of reaction are discharged and cooled, and thereafter subjected to conversion into desired hydrocarbons by contact with a solid particle hydrocarbon synthesis catalyst under reaction conditions. In addition, the reduction product of the metal oxide is continuously recovered and passed into and through the hydrocarbon synthesis or conversion zone in the presence of the reactants and reaction products in order to improve and maximize yield of desired liquid hydrocarbons.

The synthesis reaction is effected in the substantial absence of added water vapor, namely, water vapor over and above that formed in the course of the synthesis reaction. The reduced metal oxide, at the elevated temperature and pressure of the synthesis reaction, is subjected to the oxidizing influence by the by-product water vapor formed during synthesis and also any carbon dioxide which may exist in the synthesis reaction zone, and thus tends to be returned to its original state of oxidation.

The powdered, reducible metal oxide thus raised to an increased state of oxidation in the reaction zone is continuously removed and thereafter caused to react with additional hydrocarbonaceous feed stock, preferably after intermediate supplementation or completion of the oxidation in a separate zone. The reducible metal oxide accordingly functions as an oxygen carrier operative to continuously supply the oxygen requirements for partial oxidation of the hydrocarbon feed material into hydrogen and carbon monoxide, and thereafter to controlledly absorb oxygen in the synthesis reaction zone. Accordingly, the term oxygen carrier as used therein is intended to include those metals and oxides thereof which in a higher condition of oxidation are readily reducible by the hydrocarbon under elevated temperatures into essentially hydrogen and carbon monoxide.

An important advantage of the present invention follows from the fact that the hydrocarbon synthesis is effected by an active synthesis catalyst under controlled conditions of temperature and pressure at which the distribution and yield of the desired hydrocarbons can be maintained under predetermined control. To this end, the synthesis reaction zone is occupied continuously by an effective hydrocarbon synthesis catalyst through which the reactants and the reduced particles of oxygen carrier pass, an appropriate separation being made between the reaction products and the catalyst such that both the fluid products and the effluent particles of oxygen carrier are continuously withdrawn from the reaction zone while the catalyst particles remain.

As a further result of the foregoing, the gases constituting the by-product end result of the synthesis step, to a substantial extent, at least, are consumed in the reoxidation of the oxygen carrier, and hence are abstracted from the zone of reaction to such an extent as to materially lower their partial pressure below that which otherwise characterizes the reaction.

By reason of this effect, and presumably in accordance with the law of mass action, the utilization of the fresh feed hydrogen and carbon monoxide in the formation of desired hydrocarbons is materially improved. In any event, the amount of hydrogen, carbon monoxide and carbon dioxide in the final tail gas is substantially reduced as contrasted with prior processes with which I am familiar, the net consumption of carbon monoxide being maintainable above 95 to 99 per cent and yielding essentially hydrocarbons.

This may follow from the fact that the relative decrease in the proportion of by-product water vapor present in the reaction zone is necessarily accompanied by a corresponding relative increase in hydrogen resulting from the oxidation reaction. Also, where carbon dioxide enters into the oxidation of the oxygen carrier, a commensurate supplementation of the carbon monoxide present in the reaction zone results. Moreover, in the presence of a typical iron synthesis catalyst where conditions favorable to the water-gas shift reaction prevail, a decrease in the proportion of water vapor necessarily alters equilibrium in the direction of decreased carbon dioxide. As a result, the objectionable diversion of feed carbon monoxide into undesired by-product carbon dioxide may be controlled and overcome in substantial measure.

From the foregoing, it is apparent that the invention has particular application to hydrocarbon synthesis catalysts of the iron or iron containing type. Such catalysts while particularly advantageous from numerous other standpoints usually cause objectionable formation of carbon dioxide, which the present invention overcomes.

The catalyst may comprise iron in particle form or may consist of a suitable catalytic form of iron deposited upon a carrier such as silica gel, fuller's earth and the like. Inclusion of minor proportions, e. g. 0.5-5.0%, of the typical activating or promoting agents, such as the oxides of alkali or alkaline earth metals, alumina, titania, zirconia, thorium oxide and the like, is contemplated. The usual practice of forming the catalyst by reduction of a suitable iron compound with hydrogen or other appropriate reducing agent, followed by conditioning with a synthesis gas, is also envisioned.

The oxygen carrier or reducible metal oxide, as intimated above, involves a class of substances which may be exemplified by oxides of the polyvalent metals, molybdenum, tungsten, manganese, chrome, titanium. Iron, zinc, copper and nickel also form equivalent reducible oxides. The oxygen carrier therefore may include any readily oxidized metal, which, in the form of its oxide reacts with a hydrocarbon at elevated temperature to form hydrogen and carbon monoxide.

In the case of $MoO_3$, reaction readily occurs between finely divided oxide and a gaseous or gasiform hydrocarbon at temperatures in the range of from about 1100-1200° F. and higher, preferably in the range from about 1450-1850° F. In general, it is preferred, therefore, to effect the generation of synthesis gas at temperatures above about 1400-1500° F.

Advantageously, the continual passage of the oxygen carrier through the synthesis zone is effected by passing the finely divided particles through interstices within the catalyst mass. To this end, the individual catalyst particles in the synthesis zone may be of relatively large particle size, as for example, in the 60-100 mesh range, while the oxygen carrier particles occupy a substantially lower size range of, for instance, 60 microns and finer. In an ordinary fixed or moving bed operation, the reactant gases flow, at an appropriate linear rate, through the catalyst mass with the oxygen carrier particles entrained therein. A somewhat analogous effect results where the relatively coarse particle catalyst is maintained in a dense fluid phase by the upflowing reactants, and the relatively fine carrier particles progress upwardly and are carried out of the reaction zone in the effluent gases. In either case, the oxygen carrier is conveyed through the synthesis zone with the reactants while the large catalyst particles tend to remain therein.

In order to more fully exemplify the present invention, reference is had to the accompanying drawing illustrating more or less diagrammatically one preferred embodiment of the invention. Therein a stream of hydrocarbons, such as methane, from any suitable source, not shown, is injected through pipe 10 into a conduit 11, continuously supplied with a fine particle stream of reducible metal oxide, making a suspended or entrained fluid phase which passes into heat exchanger 13.

In the exchanger 15, the temperature of the mixture is raised to about 1000-1500° F. or more. The heated suspension of oxygen carrier in methane passes through pipe 14 into heater 15 where temperature is raised preferably above 1500° F. to a level at which reduction of the metal oxide by the hydrocarbon gas proceeds effectively. The heated fluid moves directly through pipe 16 into the bottom of a gas generation zone 18. Heater 15 may be supplied with fuel by pipe 17. Provision is made for the introduction of additional limited quantities of preferably pure oxygen through valved inlet 20 to further supplement the thermal requirements of the generation zone 18, if desired.

At the high temperatures prevailing, the entrained fluid phase of reducible metal oxide within the column 18 yields oxygen to the hydrocarbon vapors such that the conversion products withdrawn from the outlet pipe 21 comprise predominantly or essentially hydrogen and carbon monoxide.

The synthesis gas thus formed is cooled by repassage through the exchanger 13 as indicated, to preheat the feed to the gas generation zone 18 by indirect exchange. The cooled synthesis gas, together with the entrained fluid phase oxygen carrier particles now in the reduced form are passed by way of pipe 23 into synthesis reaction zone 24 occupied by a mass of relatively coarse synthesis catalyst maintained at a temperature of about 650° F. by cooling surfaces more or less diagrammatically indicated by the reference numeral 25.

Heat exchanger 25 is supplied with a circulating coolant introduced through pipe 26 and withdrawn through pipe 27 at a controlled rate sufficient to continuously abstract exothermic heat of reaction as required for temperature control.

As above indicated, the conversion of the hydrogen and carbon monoxide is initiated upon contact of the synthesis gas with the catalyst and is essentially completed by the time the reactants reach the top of the catalyst mass.

Simultaneously, the entrained phase of oxygen carrier passes or migrates through the mass and emanates from the upper surface of the catalyst with the gasiform effluent stream.

The effluent product gas and entrained carrier particles pass through outlet pipe 28 into oxidation zone 29, after first receiving by injection through pipe 30 an addition of steam, oxygen or any other oxidizing agent effective to supplement or complete the reoxidation of the oxygen carrier. This insures return of the oxygen carrier to a condition effective for maximum formation of synthesis gas.

From the oxidizing zone 29, the mixture of product gases and entrained solids passes through pipe 31 into a separator 32, such as a magnetic, electrostatic, cyclone separator or filter effective to recover and discharge the suspended, solid particles through standpipe 38 and deliver the gases overhead.

Thus treated catalyst is continually returned by way of standpipe 38, controlled by mechanical feeder 39, to the conduit 11 where it is picked up by the stream of hydrocarbons introduced through pipe 10, as previously indicated.

The overhead gasiform products of reaction from separator 32 pass through pipe 41 and condenser 42 to a separator 43 from which desired liquid hydrocarbons are recovered by way of pipe 45. Aqueous condensate is discharged through pipe 46, and the normally gaseous residue passes overhead as at 47. A portion of the last named stream may be diverted through branch pipe 48 and pump 49 for recycle to the inlet of the synthesis reactor as shown.

It has been found particularly advantageous, however, in accordance with the present invention, continually to recycle a portion of the effluent products of reaction to the reactor inlet by way of branch pipe 51 and pump 52. This feature is of importance in that it not only promotes and furthers maximum oxidation of the oxygen carrier in the synthesis reaction zone and simultaneous suppression of undesired oxidizing gases therein, but secures the additional benefits of recycle operation without the necessity for uneconomical condensation and separation steps. This follows presumably from the fact that the objections to by-product water vapor recycle, e. g., excessive formation of carbon dioxide, are substantially overcome, as the result of the consumption of water vapor occurring during oxidation of the oxygen carrier.

By permitting the synthesis reaction to operate effectively on direct or so-called hot recycle, temperature in the catalyst bed is more uniform and stable.

It may be noted that the direct recycle through pipe 51 will include entrained oxygen carrier. In this way, the overall residence time of the entrained solid particles within the synthesis zone may be controlled within wide limits such that a substantial degree of reoxidation of the carrier may be effected.

In accordance with one example, finely divided molybdenum trioxide, of less than 200 mesh, is placed in suspension in a stream of methane and the mixture raised to a temperature of about 1500° F. in a generation zone held at a pressure of about 200 p. s. i. g. After a substantial time of contact, the mixture is cooled to a temperature of about 650° F. and comprises essentially molybdenum in a lesser state of reduction suspended in a stream comprised essentially of mixed hydrogen and carbon monoxide.

The suspension is passed through a dense fluid phase of iron synthesis catalyst having a particle size about 100 mesh, at a linear velocity of about 1 foot per second, with a contact time of about 20 seconds, under temperature and pressure conditions of about 650° F. and 250 p. s. i. respectively.

The effluent gasiform products, containing the suspended particles of oxygen carrier, are withdrawn from the upper pseudo-liquid surface of the dense fluid phase and the entrained solid particles are separated and recycled into admixture with additional feed gases.

The product gas stream from the synthesis reaction zone, under condensation, yields a product oil layer boiling in the motor gasoline range, and corresponding to about 70 per cent of the methane feed consumed on a weight basis. The net production of carbon dioxide amounts to less than about 5 per cent on the basis of carbon feed to the system and the separated oxygen carrier is in a condition suitable for the oxidation of additional fresh feed hydrocarbon.

It will be understood that instead of methane, the hydrocarbon feed to the reactor may comprise any other hydrocarbon capable of being partially oxidized by a reducible metal oxide with the formation of hydrogen and carbon monoxide. This includes not only the normally gaseous hydrocarbons but the liquid hydrocarbons capable of vaporization at high temperatures and in the broadest aspect, is applicable to solid hydrocarbons, such as coal, capable of being oxidized as above in the form of a fine powder.

The term "hydrocarbon" as broadly used herein is intended to include the class of oxygenated hydrocarbons, such as the organic alcohols, acids, esters, ketones, aldehydes and the like. It is contemplated that such products will normally accompany the desired product stream to a minor extent and may be selectively produced in substantial proportion by selection of proper temperature and pressure in the synthesis zone.

Obviously, many modifications and variations of the invention as hereinabove set forth may be made without departing from the spirit and scope thereof, and therefore only such limitations should be imposed as are indicated in the appended claims.

I claim:

1. The method of converting a hydrocarbon feed material into desired hydrocarbon fractions which comprises reacting said hydrocarbon feed material with a reducible metal oxide at an elevated temperature at which said hydrocarbon feed material is converted into carbon monoxide and hydrogen and the said metal oxide is subjected to reduction, continuing said reduction until a substantial portion of said hydrocarbon is converted into hydrogen and carbon monoxide, continuously passing said carbon monoxide and hydrogen in contact with a hydrocarbon synthesis catalyst, distinct from said reducible metal oxide, in a synthesis zone at an elevated temperature at which desired hydrocarbons are produced, maintaining contact between said reactants and said catalyst until substantial conversion of hydrogen and carbon monoxide occurs into desired hydrocarbon fractions, continually passing said reduced metal oxide through said synthesis zone in contact with said catalyst and reactants, effecting substantial reoxidation of said reduced metal oxide during passage through said synthesis zone, thereafter withdrawing gasiform products of reaction and reoxidized particles of metal oxide from contact with the catalyst and recovering desired hydrocarbons from said gasiform products.

2. The method according to claim 1 wherein the said reoxidized particles of metal oxide withdrawn from contact with the catalyst are thereafter subjected to supplementary oxidation to form more highly oxidized particles for reaction with additional hydrocarbon feed material.

3. The method according to claim 1, wherein the stream of gasiform products of reaction withdrawn from contact with the catalyst in the synthesis zone is divided into two streams, one of which is continuously recycled to the inlet of the said synthesis zone without substantial cooling.

4. The method according to claim 1, wherein the hydrocarbon synthesis catalyst comprises a mass of relatively coarse solid particles having interstices through which said reduced metal oxide passes in the form of a relatively fine powder substantially entrained in the flow of reactants.

5. The method according to claim 1, wherein said hydrocarbon synthesis catalyst comprises a dense phase fluidized mass of relatively coarse particles through which the reduced metal oxide passes upwardly in the form of relatively fine particles entrained within the reactant flow.

6. The method of synthesizing desired hydrocarbons which comprises continuously reacting a finely divided, readily reducible metal oxide with a carbonaceous feed material at an elevated temperature at which the reaction products comprise carbon monoxide and fine particles of the metal oxide in reduced form, continuously passing said gaseous carbon monoxide with the particles of reduced metal oxide entrained therein, through a synthesis zone containing a hydrocarbon synthesis catalyst, distinct from said reducible metal oxide, in the presence of hydrogen at an elevated temperature at which the desired hydrocarbons are directly formed, maintaining contact between said reactants and said catalyst until a substantial conversion into desired hydrocarbons is effected, simultaneously effecting substantial reoxidation of said reduced metal oxide particles by contact with by-product water vapor formed in the synthesis zone as the result of hydrocarbon synthesis, withdrawing from contact with the catalyst gasiform reaction products containing said metal oxide particles entrained therein, recovering desired hydrocarbons therefrom and continuously effecting the reaction of said metal oxide particles with additional carbonaceous feed material.

7. The method according to claim 6, wherein the hydrocarbon synthesis catalyst is an iron-containing catalyst and the temperature in said synthesis zone is in the range of from about 550 to 700° F.

8. The method of converting a hydrocarbon feed material into desired hydrocarbon products which comprises contacting said hydrocarbon feed material with a reducible metal oxide under reaction conditions including an elevated temperature at which the hydrocarbon feed and the reducible metal oxide react to cause oxidation of the hydrocarbon with the formation of carbon monoxide and hydrogen, and simultaneously to cause reduction of the metal oxide with the formation of a reduction product thereof, effecting substantial reaction between said hydrocarbon feed and said reducible metal oxide, with the formation of substantial quantities of hydrogen, carbon monoxide and reduced metal oxide, thereafter contacting said hydrogen and carbon monoxide in a synthesis reaction zone with a mass of hydrocarbon synthesis catalyst, distinct from said reducible metal oxide, at an elevated temperature at which the said catalyst is active to convert said gases into substantial quantities of said desired hydrocarbon products, effecting said contact between the gaseous reactants and said hydrocarbon synthesis catalyst in the presence of said reduced metal oxide such that substantial reoxidation of said reduction product occurs within the synthesis reaction zone, thereafter withdrawing gasiform products of reaction and reoxidized metal oxide from contact with the catalyst and recovering the desired hydrocarbon products from the gasiform effluent.

9. The method of synthesizing desired hydrocarbon products which comprises contacting a readily reducible metal oxide with a carbonaceous feed material under reaction conditions including an elevated temperature at which the carbonaceous feed material and the reducible metal oxide react to cause oxidation of the carbonaceous material with the formation of carbon monoxide and simultaneously to cause reduction of the metal oxide with the formation of a reduction product thereof, effecting substantial reaction between said carbonaceous feed material and said reducible metal oxide with the formation of substantial quantities of carbon monoxide and reduced metal oxide, thereafter contacting said carbon monoxide in a synthesis reaction zone with a mass of hydrocarbon synthesis catalyst, distinct from said reducible metal oxide, in the presence of hydrogen at an elevated temperature at which the said catalyst is active to convert said gases into said desired hydrocarbon products, maintaining contact between said reactant gases and said catalyst until substantial conversion into the desired products results, effecting said contact in the presence of said reduced metal oxide such that substantial reoxidation of said reduction product occurs within the synthesis reaction zone in the presence of by-product water vapor formed as a result of hydrocarbon synthesis, thereafter withdrawing gasiform reaction product and reoxidized metal oxide from contact with the mass of catalyst and recovering the desired hydrocarbon products from the gasiform effluent.

10. The method of converting a carbonaceous feed material into desired hydrocarbon fractions which comprises contacting a readily reducible metal oxide with said carbonaceous feed material at an elevated temperature such that substantial reaction occurs in which the metal oxide is subjected to substantial reduction, and the carbonaceous feed is substantially converted into synthesis gas comprising essentially hydrogen and carbon monoxide, passing synthesis gas in contact with an active hydrocarbon synthesis catalyst, distinct from said reducible metal oxide, in a synthesis zone under reaction conditions including a lower temperature in the range at which said synthesis catalyst actively converts synthesis gas into said desired products and carrying out contact between said synthesis catalyst and synthesis gas in the presence of the reduction product of said metal oxide, thereby subjecting said reduction product to the oxidizing influence of the oxidizing by-product formed as the result of catalytic hydrocarbon synthesis such that reoxidation of said reduction product occurs with the formation of additional synthesis gas constituents in the synthesis zone.

11. The method according to claim 10 wherein the readily reducible metal oxide subjected to reduction by said carbonaceous feed comprises the reoxidation product of said reduced metal oxide formed in the synthesis zone.

12. The method according to claim 10 wherein the synthesis zone is continuously supplied with said reduced metal oxide.

HAROLD V. ATWELL.

REFERENCES CITED

The following references are of record in the file of this patent:

UNITED STATES PATENTS

| Number | Name | Date |
| --- | --- | --- |
| 2,042,285 | Wilke | May 26, 1936 |
| 2,253,607 | Boyd | Aug. 26, 1941 |
| 2,360,787 | Murphree et al. | Oct. 17, 1944 |
| 2,443,673 | Atwell | June 22, 1948 |

OTHER REFERENCES

Audibert: Journal Ind. Eng. Chem., vol. 21, 1929, pages 880–885.